United States Patent [19]

Imai et al.

[11] Patent Number: 4,950,520
[45] Date of Patent: Aug. 21, 1990

[54] OPTICAL RECORDING MEDIUM AND METHOD MANUFACTURING THEREOF

[75] Inventors: Kunio Imai; Saburo Aso; Hideo Kudo, all of Saitama; Masataka Uchidoi, Yamanashi, all of Japan

[73] Assignees: Pioneer Electronic Corporation, Tokyo; Pioneer Video Corporation, Yamanashi, both of Japan

[21] Appl. No.: 947,304

[22] Filed: Dec. 29, 1986

[30] Foreign Application Priority Data

Dec. 27, 1985 [JP] Japan .................................. 60-292911
Dec. 27, 1985 [JP] Japan .................................. 60-292912

[51] Int. Cl.$^5$ .............................................. B32B 3/00
[52] U.S. Cl. .......................................... 428/64; 428/65; 428/402; 428/418; 428/689; 428/913; 430/945; 346/135.1; 369/284; 369/288
[58] Field of Search ................. 428/65, 402, 418, 689, 428/64, 913; 430/945; 346/135.1; 369/284, 288

[56] References Cited

U.S. PATENT DOCUMENTS

| | | | |
|---|---|---|---|
| 4,353,977 | 10/1982 | Gerber et al. | 430/945 |
| 4,441,179 | 4/1984 | Slater | 346/135.1 |
| 4,587,533 | 5/1986 | Nakane et al. | 430/945 |
| 4,668,549 | 5/1987 | Lippits et al. | 430/945 |
| 4,670,332 | 6/1987 | Werner et al. | 430/945 |

FOREIGN PATENT DOCUMENTS 0063439  10/1982  European Pat. Off. .

Primary Examiner—Patrick Ryan
Attorney, Agent, or Firm—Sughrue, Mion, Zinn, Macpeak & Seas

[57] ABSTRACT

An optical disk and method of preparing it in which a macromolecular substrate has information bits mechanically formed on its surface and a reflective metallic reflective film is deposited thereover. The grain size of the metallic reflective film is kept to less than 50 nanometers by depositing at a rate of no more than 1.5 nanometers per second.

5 Claims, 1 Drawing Sheet

OPTICAL RECORDING MEDIUM AND METHOD MANUFACTURING THEREOF

BACKGROUND OF THE INVENTION

1. Field of the Invention

The present invention relates to an optical recording medium, such as an optical video disk, a compact disk, or the like, in which a reflective metallic thin film is formed through evaporation on a surface of a substrate on which information bits of sub-micrometer size are to be formed. One surface of the substrate is irradiated with light so as to read the information bits by means of reflected light to thereby transmit information, such as an image, sound, characters, figures, and the like.

2. Background of the Invention

Conventionally, an optical video disk, an example of the optical recording medium of the kind described above, is formed as shown in FIGS. 1 and 2. The method of manufacturing the recording medium will be described hereunder.

In the drawings, a substrate 1 is made of a macromolecular compound consisting of components having a polar group at their side chains, for example, acrylic resin or epoxy resin. Information bits 5 are formed on the surface of the substrate 1 by means of a stamper or the like.

A thin film 2 made of aluminum or an alloy of the same is formed through evaporation as a reflective film on the surface of the substrate 1 having the information bits 5 formed thereon so as to reflect light rays, such as laser light or the like, which enter the substrate 1 from its opposite surface.

The thus evaporation-formed thin film 2 is coated with a protective film 3. Then an adhesive 4 is applied on the protective film 3. Two of the thus prepared substrates 1 are stacked together with the respective surfaces each applied with the adhesive 4 on their joining surfaces being stuck together. Thus, an optical video disk is fabricated.

In one method, the evaporation of aluminum is performed in a high vacuum, for example, at $10^{-5}$ torr and the aluminum thin film 2 is formed at a high speed, for example, at an evaporation speed of not lower than 2 nanometers per second. This method is recommended for general use in order to provide a beautiful appearance. In fact, this method is used in commercial production.

In order to read the information bits 5 by irradiating the surface of the substrate 1 with light rays such as laser light or the like, the light rays such as laser light or the like are concentrated into a spot of about 1 micrometer in diameter to irradiate the bit surface with the light spot to thereby read the information by analyzing the reflected light from the bit surface.

If the evaporation of aluminum is performed in a high vacuum and at a high speed as described above, generally, the crystal grain size of the thin film is generally equal to or larger than 50 nanometers.

If the grain size is larger than about 50 nanometers, extremely small peelings are generated between the substrate 1 and the aluminum thin film 2 owing to time aging to thereby generate blisters 6 of substantially the same size as the information bits 5 as shown in FIG. 3.

Such blisters 6 are important in the case where information is read from an optical recording medium as described above. That is, the disk is subject to a defect that faults such as erroneous reading of proper signals occur.

SUMMARY OF THE INVENTION

It is therefore an object of the present invention to eliminate the disadvantages discussed above in the conventional optical recording medium.

It is another object of the present invention to provide an optical recording medium in which the generation of the foregoing blisters arising from aging or heating is prevented from occurring and there occurs no trouble of color flash generation and/or erroneous reading faults.

It is a further object of the present invention to provide a method of manufacturing such an optical recording medium as described just above.

In order to achieve the above-mentioned objects, according to a first aspect of the present invention, the optical recording medium comprises a substrate made of a macromolecular compound consisting of components having a polar group at their side chains such as acrylic resin. Information signal bits are formed on a surface of the substrate and a thin film is formed on the surface of the substrate over the information signal bits. The thin film is made of a material selected form a metal group consisting of aluminum, an alloy of aluminum, and the like. A crystal grain size of the thin film is selected to be not larger than 50 nanometers.

According to a second aspect of the invention, the method of manufacturing an optical recording medium comprising the steps of preparing a substrate carrying information signal bits formed on its surface thereof and forming a reflective thin film by evaporation of aluminum, an aluminum alloy, or the like, onto the surface of the substrate over the information signal bits at a speed not higher than 1.5 nanometers per second.

Hereinafter, the term "color flash" is defined as the phenomenon in which a picture reproduced from an optical recording medium flickers as if stars were twinkling in the reproduced picture. The color flash arises from faults in a recording surface of the optical recording medium.

The foregoing and other objects, features and advantages of the invention will be apparent form the following description taken in connection with the accompanying drawing.

DETAILED DESCRIPTION OF PREFERRED EMBODIMENTS

Figure 1:
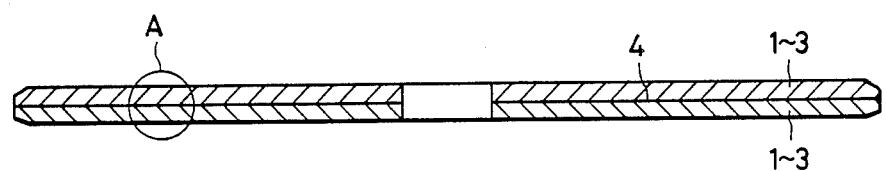
FIG. 1 is a cross-section of an optical video disk.
Figure 2:
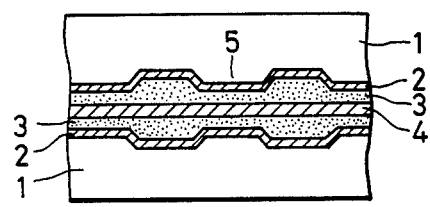
FIG. 2 is an enlarged section of a part of the same.
Figure 3:
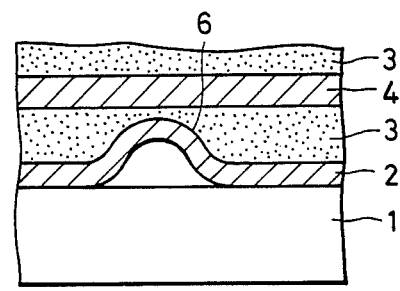
FIG. 3 is an enlarged section showing a blister of a thin film.

The present invention has originated from the discovery of the fact that the color flash or erroneous reading is caused during reading on an optical recording medium by the previously described blisters 6 of the aluminum thin film 2 of FIG. 3.

It has been found that the blisters 6 have a close relationship with the crystal grain size of the thin film 2 formed on the substrate 1.

That is, there were prepared two kinds of substrates respectively provided with aluminum thin films 2 each having a film thickness of 40–80 nanometers but respectively having a grain size not larger than 20–30 nanometers and a grain size not smaller than 50–80 nanometers.

Those substrates were left in a room for a long time and some of them were heated and dampened to accelerate deterioration. The result was that no blisters were generated in the thin film of small crystal grain size while blisters were generated in the thin film of large crystal grain size.

The reason why such a phenomenon occurs is considered to be as follows. There is a difference in the coefficient of thermal expansion between the aluminum thin film 2 and the substrate 1 due to the difference in the quality of material between the thin film 2 and the substrate 1. This difference in the coefficients causes a difference in expansion/contraction between the thin film 2 and the substrate 1 which appears as a distortion. This distortion is difficult to disperse if the crystal grain size is large, so that the thus generated stress overcomes the bonding force between the substrate 1 and the thin film 2 to thereby partially peel the thin film 2 from the substrate 1 to generate the blisters 6.

In the thin film of the small crystal grain size, on the other hand, it is considered that the foregoing distortion is easily dispersed by slippage of crystal or the like, so that there occurs no stress sufficient to peel the thin film 2 form the substrate 1.

It has been found that the aluminum thin film 2 having such a small crystal grain size can be formed when the evaporation speed is selected to be equal to or lower than (1.5 nanometers) per second and the degree of vacuum is set to the order of $10^{-4}$ torr.

In view of the foregoing point, according to the present invention, the crystal grain size of the reflective thin film 2 of a group of metal formed on the surface of the substrate 1 having the information bits 5 formed thereon is selected to be not larger than 50 nanometers.

In an optical video disk in which the thin film 2 is formed in such a condition as described above, no blister 6 is generated so that a picture of good quality can be obtained even under a difficult condition such as heating and/or dampness.

Accordingly, reliability during aging is improved.

Particularly, if the substrate 1 is made of a macromolecular compound consisting of components having a polar group in their side chains such as acrylic resin or epoxy resin, the polar group has a strong bonding force with aluminum so that the blisters 6 are apt to be generated. In this regard, however, the reduction in crystal grain size is effective to prevent the blisters 6 from occurring.

Although the invention has been described for an aluminum thin film, the method can be similarly applied to the formation of thin films of a metal group having reflective property such as an aluminum alloy, silver, gold, or the like, to be used for the same purpose.

The present invention can be realized in manufacturing not only the optical video disks as described above but other optical recording media such as compact disks, DRAW disks, E-DRAW disks, and so on.

Further, the method according to the present invention is extremely effective for the prevention of the foregoing deterioration when used in manufacturing an optical recording media having substrates made of a macromolecular compound of components having a polar group at their side chains. Such macromolecular compounds are acrylic resins or epoxy resins, in which the polar group has a strong bonding force with aluminum.

As described above, according to the present invention, no blister is generated in the reflective thin film of a metal group during aging or temperature excursions, and so on, so that there occurs no deterioration in signal such as color flash, erroneous reading of information, or the like. Reliability is thus improved.

In the case of using the crystal grain size as described above according to the invention, the difference in expansion/contraction between the substrate and the thin film owing to time aging, heat impact, or the like, is dispersed to thereby prevent blisters and peelings of the thin film from occurring. Therefore, any color flash and any erroneous reading of information signals due to blisters or peelings can be prevented from occurring to thereby extremely improve the reliability.

The manufacturing method can be carried out only by lowering the speed of evaporation for forming the thin film below the conventional speed as well as can be carried out in a low vacuum, so that the productivity can be maintained.

Although the generation of blisters has been prevented, conventionally, by means of fine control on the external conditions such as water, or the like, the control becomes unnecessary in the manufacturing method according to the invention in which the crystal grain size is made small, so that the productive efficiency can be significantly improved.

What is claimed is:

1. An optical recording medium, comprising:
   a substrate having a surface on which indent information bits are formed, said substrate being made of a macromolecular material compound comprising components having a polar group at their side chains, and
   a reflective film formed on said surface of said substrate over said information signal bits, said reflective film being made of a metallic material, a crystal grain size of said reflective film being selected to be not larger than 50 nanometers.

2. An optical recording medium as recited in claim 1, wherein said macromolecular compound is an acrylic resin.

3. An optical recording medium as recited in claim 1, wherein said metallic material is aluminum or an aluminum alloy.

4. An optical recording medium as recited in claim 1, further comprising a protective film formed on each of said reflective films.

5. An optical recording medium, comprising:
   two substrates, each said substrate having a surface on which indent information signal bits are formed, each said substrate being made of a macromolecular material compound comprising components having a polar group at their side chains,
   a reflective film formed on said surface of each of said substrates over said information signal bits, said reflective film being made of a metallic material, a crystal grain size of said reflective film being selected to be not larger than 50 nanometers,
   a protective film formed on said reflective film, and
   an adhesive applied on at least one surface of said protective film,
   wherein said two substrates are stacked together with the respective surfaces.

* * * * *